United States Patent
Ding et al.

(10) Patent No.: US 12,030,033 B1
(45) Date of Patent: Jul. 9, 2024

(54) SODIUM ALGINATE-GELATIN BASED BIOCHAR MULTIVARIATE COMPOSITE MATERIAL, PREPARATION METHOD THEREFOR AND METHOD FOR REMOVING CADMIUM IN WATER BODIES

(71) Applicant: Anhui University of Technology, Maanshan (CN)

(72) Inventors: Lei Ding, Maanshan (CN); Yan Li, Maanshan (CN); Jiangya Ma, Maanshan (CN); Huiwen Zhang, Maanshan (CN); Yanli Kong, Maanshan (CN)

(73) Assignee: Anhui University of Technology, Maanshan (CN)

( * ) Notice: Subject to any disclaimer, the term of this patent is extended or adjusted under 35 U.S.C. 154(b) by 0 days.

(21) Appl. No.: 18/403,358

(22) Filed: Jan. 3, 2024

(30) Foreign Application Priority Data

Jan. 13, 2023 (CN) .......................... 202310070343.4

(51) Int. Cl.
| | |
|---|---|
| *B01J 20/24* | (2006.01) |
| *B01J 20/20* | (2006.01) |
| *B01J 20/28* | (2006.01) |
| *B01J 20/30* | (2006.01) |
| *B01J 20/32* | (2006.01) |
| *C02F 1/28* | (2023.01) |
| *C02F 101/20* | (2006.01) |

(52) U.S. Cl.
CPC .............. *B01J 20/24* (2013.01); *B01J 20/20* (2013.01); *B01J 20/28047* (2013.01); *B01J 20/3071* (2013.01); *B01J 20/3204* (2013.01); *B01J 20/3242* (2013.01); *C02F 1/288* (2013.01); *C02F 1/283* (2013.01); *C02F 1/286* (2013.01); *C02F 2101/20* (2013.01)

(58) Field of Classification Search
None
See application file for complete search history.

(56) References Cited

FOREIGN PATENT DOCUMENTS

| CN | 101224412 A | * | 7/2008 | |
|---|---|---|---|---|
| CN | 101224412 A | | 7/2008 | |
| CN | 106563417 B | * | 12/2018 | .............. B01J 20/24 |

OTHER PUBLICATIONS

Wang et al. (Journal of Industrial and Engineering Chemistry, 2018, 61, 161-168). (Year: 2018).*

(Continued)

*Primary Examiner* — Clare M Perrin

(57) ABSTRACT

A sodium alginate-gelatin based biochar multivariate composite material, a preparation method therefor and a method for removing cadmium in water body are provided and relate to the technical field of biochar adsorbent materials. The sodium alginate-gelatin based biochar multivariate composite material has a high and stable removal efficiency for cadmium divalent cation ($Cd^{2+}$) in a potential of hydrogen (pH) range of 4-7 in the water body, with a maximum adsorption capacity of 86.25 (milligrams per gram) mg/g. The composite material of the disclosure has good recyclability. After five regeneration tests, the adsorption capacity of the composite material for $Cd^{2+}$ can still reach 70% of the initial adsorption capacity. The preparation method of the disclosure has simple process, easy control, low manufacturing cost, and is suitable for large-scale production and application.

4 Claims, 4 Drawing Sheets

(56) References Cited

OTHER PUBLICATIONS

Machine translation of CN-106563417-B, pp. 1-7. (Year: 2018).*
Sutthasupa et al. (International Journal of Biological Macromolecules, 2023, 253, 127464. (Year: 2023).*
Machine translation of CN-101224412-A, pp. 1-8. (Year: 2008).*
Liu et al. (Environmental Pollution, 2020, 264, 114785). (Year: 2020).*
Roh et al. (Journal of Industrial and Engineering Chemistry, 2015, 26, 226-233). (Year: 2015).*
Bing Wang et al., Entrapment of ball-milled biochar in Ca-alginate beads for the removal of aqueous Cd(II), Journal of Industrial and Engineering Chemistry, 2018, pp. 161-168, vol. 61.
CNIPA, Notification of First Office Action for CN202310070343.4, May 24, 2023.
Anhui University of Technology (Applicant), Reply to Notification of First Office Action for CN202310070343.4, w/ (allowed) replacement claims, Jun. 29, 2023.
CNIPA, Notification to grant patent right for invention in CN202310070343.4, Jul. 11, 2023.

* cited by examiner

SODIUM ALGINATE-GELATIN BASED BIOCHAR MULTIVARIATE COMPOSITE MATERIAL, PREPARATION METHOD THEREFOR AND METHOD FOR REMOVING CADMIUM IN WATER BODIES

TECHNICAL FIELD

The disclosure relates to the technical field of biochar adsorbent materials, and particularly to a sodium alginate-gelatin based biochar multivariate composite material, a preparation method therefor and a method for removing cadmium in water bodies.

BACKGROUND

With the rapid development of urbanization and industrialization, heavy metal pollution generated by industries such as mining, metallurgy, machinery manufacturing, and smelting poses an increasingly serious threat to human health. Unlike other pollutants, the severe toxicity and non-degradability of heavy metal pollution can lead to significant environmental risks. Cadmium (Cd), as a typical representative element in heavy metal pollution, is listed as a human carcinogen with a much lower allowable exposure limit than other heavy metals. The Cd pollution in water bodies can directly affect the survival of aquatic organisms and ultimately affect human survival and development as the food chain accumulates. Due to the strict implementation of effective environmental policies and public awareness of pollution, people strongly pursue cost-effective methods to treat Cd contaminated water bodies.

The adsorption method has been widely used in the treatment of the Cd polluted water bodies due to its low cost and high efficiency. Biochar, as the most commonly used adsorbent in recent years, is characterized by a large surface area, abundant surface functional groups, and well-developed pore structure, which bring excellent adsorption performance. However, due to the dispersion of biochar powder, the difficulty of process engineering, and the difficulty of recycling, its large-scale commercial application is limited. Sodium alginate (SA) is a biopolymer extracted from kelp or seaweed, serving as a linear polysaccharide with a large number of hydroxyl and carboxyl groups distributed on its molecular chain. The combination with divalent metal cations can form a reticular gel, which is its biggest advantage. This characteristic makes SA have a huge application in industry, food and health. The stability, mechanical and mechanical properties of a single sodium alginate gel are weak, and the internal pore size is small, so it cannot meet the standard of highly effective adsorbent. Therefore, developing a new adsorbent with the maximum adsorption capacity and high reusability is of great research significance.

SUMMARY

In view of this, the disclosure provides a sodium alginate-gelatin based biochar multivariate composite material, a preparation method therefor and a method for removing cadmium in water bodies. The composite material of the disclosure has high and stable removal efficiency for cadmium divalent cation ($Cd^{2+}$), and good regeneration and utilization.

In order to achieve the above objectives, the disclosure provides the following technical solutions. Specifically, in an aspect, a sodium alginate-gelatin based biochar multivariate composite material is provided, with a Fourier transform infrared (FT-IR) diagram as shown in FIG. 1, an X-ray diffraction (XRD) diagram as shown in FIG. 2, and an X-ray photoelectron spectroscopy (XPS) diagram as shown in FIG. 3.

In another aspect, a preparation method for the sodium alginate-gelatin based biochar multivariate composite material is also provided and includes the following steps.

Step (1), sodium alginate and gelatin are added into ultrapure water, and stirred to obtain a mixed solution I.

Step (2) biochar is added into the mixed solution I, and stirred to obtain a mixed solution II.

Step (3) the mixed solution II is dropped into a (calcium chloride) $CaCl_2$ solution to form a gel ball, the gel ball is further hardened at a room temperature, and then the hardened gel ball is washed with water and then the washed gel ball is dried to obtain the sodium alginate-gelatin based biochar multivariate composite material.

In an embodiment, a volume of the ultrapure water is in a range of 180-250 milliliters (mL), a mass ratio of the gelatin to the sodium alginate is (1-4):1, and a mass ratio of the biochar to the sodium alginate is in a range of (1-3):1.

In an embodiment, a preparation method for the biochar includes steps: hulls of water chestnuts (also referred to as *Trapa bispinosa* Roxb., or *Trapa natans*) are washed and dried at 50-60° C. until a constant weight, then the dried hulls of water chestnuts are cooled and crushed, followed by screening the crushed hulls of water chestnuts through a sieve with a mesh size in a range of 40-80 mesh to obtain screened powder of the hulls of water chestnuts and the screened powder of the hulls of water chestnuts is dried to obtain dried powder of the hulls of water chestnuts. Then the dried powder of the hulls of water chestnuts is heated up to a temperature of 850° C. in an anaerobic environment at a rate of 10 (degree Celsius per minute) ° C./min and kept the temperature for 1 hour to obtain heated powder of the hulls of water chestnuts, the heated powder of the hulls of water chestnuts is taken out and collected after cooling, and the heated powder of the hulls of water chestnuts is washed with the ultrapure water to neutral and the washed powder of the hulls of water chestnuts is dried at 105°C for 12 hours to obtain the biochar, the biochar is placed in a desiccator for standby.

In an embodiment, the stirring of the step (1) includes: stirring for 3-5 hours at a stirring temperature in a range of 45-55° C.

In an embodiment, the stirring of the step (2) includes: stirring for 2-4 hours at a stirring temperature in a range of 45-55° C.

In an embodiment, a mass concentration of the $CaCl_2$ solution in step (3) is in a range of 4.5-5.3%, a drying temperature is in a range of 45-55° C., a drying time is in a range of 18-30 hours, and a hardening time is in a range of 24-48 hours.

In still another aspect, a method for removing cadmium in water body is provided and includes the following steps: a potential of hydrogen (pH) of the water body is adjusted, then the sodium alginate-gelatin based biochar multivariate composite material prepared by the preparation method mentioned above is added into the water body and mixed evenly to remove the cadmium.

In an embodiment, the pH of the water body is in a range of 4-7, and a temperature of the water body is in a range of 293-313 Kelvins (K) and a dosage of the sodium alginate-gelatin based biochar multivariate composite material is in a range of 0.5-3.0 grams per liter (g/L).

Compared with related art, the disclosure has the following beneficial effects.

The composite material of the disclosure blends the sodium alginate and the gelatin as a hydrogel polymer matrix, the biochar is wrapped in the hydrogel polymer matrix, and thereby produces the sodium alginate-gelatin based biochar multivariate composite material. The composite material of the disclosure has a high and stable removal efficiency for $Cd^{2+}$ in the pH range of 4-7 in the water bodies, with a maximum adsorption capacity of 86.25 milligrams per gram (mg/g) and a removal efficiency of over 60%. The composite material of the disclosure has good recyclability. After five regeneration tests, the adsorption capacity of the composite material for $Cd^{2+}$ can still reach 70% of the initial adsorption capacity. The preparation method of the disclosure has simple process, easy control, low manufacturing cost, and is suitable for large-scale production and application.

DETAILED DESCRIPTION OF EMBODIMENTS

Detailed description of various exemplary embodiments of the disclosure should not be construed as a limitation of the disclosure, but rather as a more detailed description of certain aspects, features, and embodiments of the disclosure.

Figure 1:
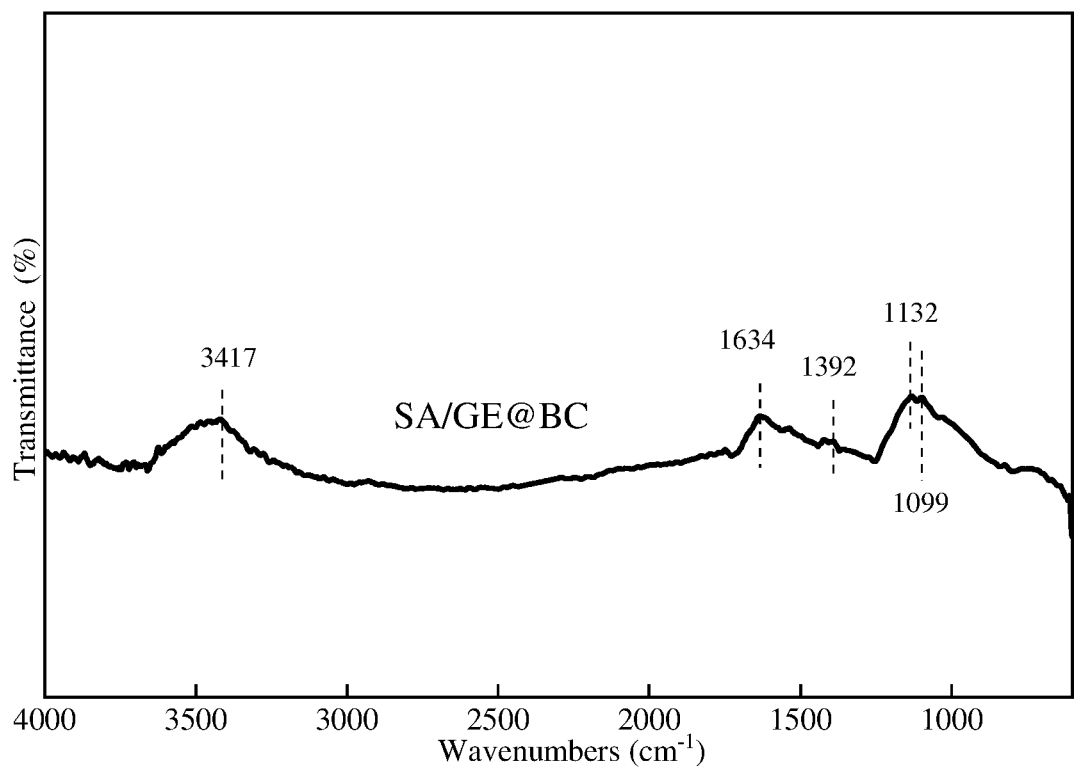
FIG. 1 illustrates a diagram of X-ray diffraction (FT-IR) of a sodium alginate-gelatin based biochar multivariate composite material (SA-GE@BC).
Figure 2:
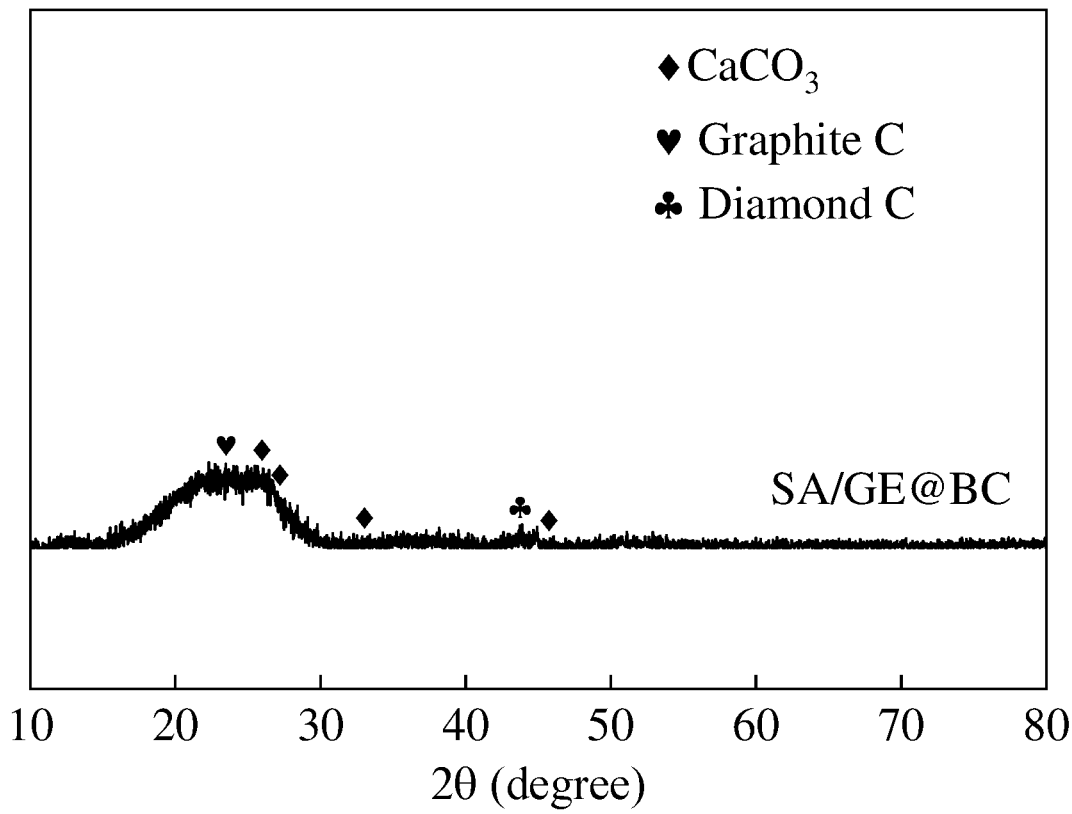
FIG. 2 illustrates a diagram of X-ray photoelectron spectroscopy (XRD) of the SA-GE@BC.
Figure 3A:
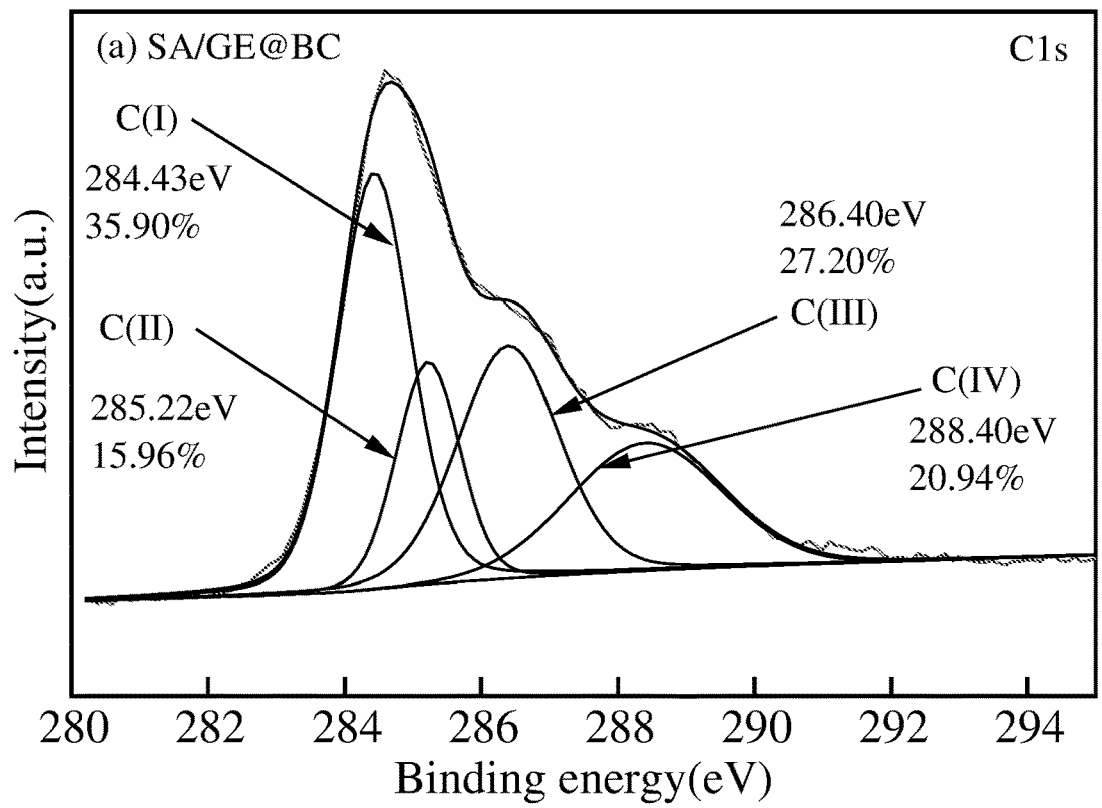
FIGS. 3A-3C illustrate diagrams of X-ray photoelectron spectroscopy (XPS) of the SA-GE@BC.
Figure 3B:
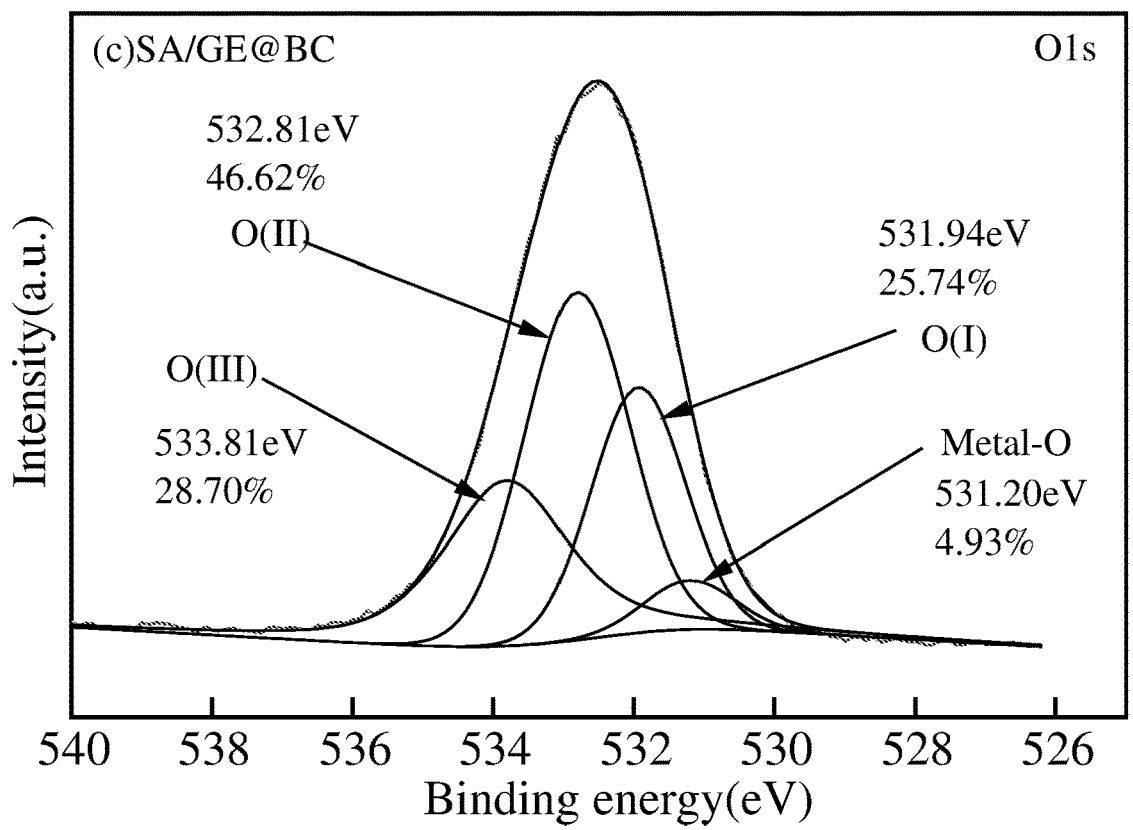
Figure 3C:
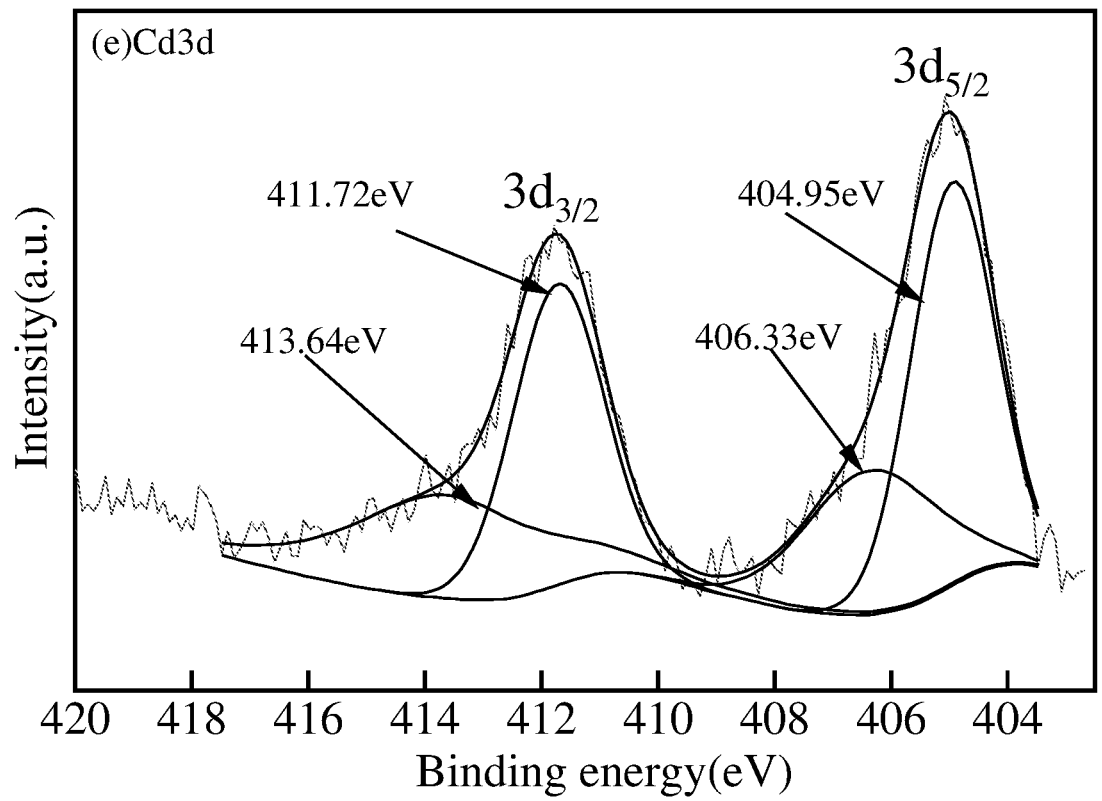

A sodium alginate-gelatin based biochar multivariate composite material is provided, with an X-ray diffraction (FT-IR) diagram as shown in FIG. 1, an X-ray photoelectron spectroscopy (XRD) diagram as shown in FIG. 2, and an X-ray photoelectron spectroscopy (XPS) diagram as shown in FIG. 3.

As shown in FIG. 1, 3417 $cm^{-1}$ represents a response peak of a hydroxyl group (—OH), 1634 $cm^{-1}$ represents an absorption response peak of a carbonyl group (C=O) and a carbon-carbon double bond (C=C), 1392 $cm^{-1}$ represents a stretching vibration peak of a carbonate ion ($CO_3^{2-}$), 1132 $cm^{-1}$ represents a stretching vibration peak of a carbon-carbon single bond (C—C), and 1099 $cm^{-1}$ represents a stretching vibration peak of a carbon-oxygen single bond (C—O). The functional groups and the numerous peaks indicate that there are a large number of functional groups on the composite material that contribute to the adsorption of cadmium ions.

As shown in FIG. 2, the composite material contains a graphite crystal structure which allows π-bond conjugate adsorption with the cadmium ions. In addition, there is some a certain calcium carbonate structure in the composite material, which is prone to improve the mechanical resistance of the composite material.

As shown in FIG. 3A, C of the SA-GE@BC can be divided into C(I), C(II), C(III), C(IV). C(I) of the SA-GE@BC represents C=C with a binding energy of 284.2 electron volts (eV) and an intensity of 35.90%; C(II) of the SA-GE@BC represents —C—O— with a binding energy of 285.1 eV and an intensity of 15.96%; C(III) of the SA-GE@BC represents C=O with a binding energy of 286.2 eV and an intensity of 27.20%; and C (IV) of the SA-GE@BC represents an ester group (O—C=O) with a binding energy of 288.9 eV and an intensity of 20.94%. As shown in FIG. 3B, binding energy peaks of Ols can be divided into O(I), O(II), O(III), O(IV). O(I) represents Metal-O with a binding energy of 531.2 eV and an intensity of 4.93%; O(II) represents C—O with a binding energy of 531.4 eV and an intensity of 25.74%; O(III) represents C=O with a binding energy of 532.0 eV and an intensity of 46.62%; O(IV) represents O—C=O with a binding energy of 533.2 eV and an intensity of 28.70%. The above results further indicate that there are a large number of functional groups in the composite material that can be used for the cadmium ion adsorption. From the full spectrum, it can be seen that there are a large number of the calcium ions in the composite material, which facilitates ion exchange with the cadmium ions.

A preparation method for the sodium alginate-gelatin based biochar multivariate composite material is also provided and includes the following steps.

Step (1), sodium alginate and gelatin are added into ultrapure water, and stirred to obtain a mixed solution I.

Step (2), biochar is added into the mixed solution I, and stirred to obtain a mixed solution II.

Step (3), the mixed solution II is dropped into a (calcium chloride) $CaCl_2$ solution to form a gel ball, the gel ball is further hardened at a room temperature, and then the hardened gel ball is washed with water and then the washed gel ball is dried to obtain the sodium alginate-gelatin based biochar multivariate composite material.

The sodium alginate and the gelatin are added into the ultrapure water, and stirred to obtain the mixed solution I. In an embodiment, a volume of the ultrapure water is in a range of 180-250 milliliters (mL), an optimal mass ratio of the gelatin to the sodium alginate is in a range of (1-4):1, a stirring time is in a range of 3-5 hours, specifically, 4 hours, and a stirring temperature is in a range of 45-55° C.

The gelatin (GE), as a hydrophilic macromolecular colloid, has good water solubility and biocompatibility. Due to the nature of its structure, amino, hydroxyl, and carboxyl groups are also abundant on its molecular chains, and these functional groups enable the gelatin to effectively remove heavy metal ions.

After the mixed solution I is obtained, the biochar is added into the mixed solution I, and stirred to obtain a mixed solution II. In an embodiment, an optimal mass ratio of the biochar to the sodium alginate is in a range of (1-3):1. A preparation method for the biochar includes steps: hulls of water chestnuts (also referred to as *Trapa bispinosa* Roxb., or *Trapa natans*) are washed and dried at 50-60° C. until a constant weight, the dried hulls of water chestnuts are cooled and crushed, followed by screening the crushed hulls of water chestnuts through a sieve with a mesh size in a range of 40-80 mesh to obtain screened powder of the hulls of water chestnuts and the screened powder of the hulls of water chestnuts is dried to obtain dried powder of the hulls of water chestnuts. Then the dried powder of the hulls of water chestnuts is heated up to a temperature of 850° C. in an anaerobic environment at a rate of 10 (degree Celsius per minute) ° C./min and kept the temperature for 1 hour to obtain heated powder of the hulls of water chestnuts, the heated powder of the hulls of water chestnuts is taken out and collected after cooling, and the heated powder of the hulls of water chestnuts is washed with the ultrapure water to neutral and the washed powder of the hulls of water chestnuts is dried at 105° C. for 12 hours to obtain the biochar, the biochar is placed in a desiccator for standby. The anaerobic environment is in a nitrogen atmosphere, a helium atmosphere, or an argon atmosphere.

In an embodiment, an optimal mass ratio of the gelatin, the sodium alginate, and the biochar is 1:1:1, a stirring time is in a range of 2-4 hours, specifically, 2 hours, and a stirring temperature is in a range of 45-55° C.

After the mixed solution II is obtained, the mixed solution II is dropped into the $CaCl_2$ solution to form the gel ball, the gel ball is further hardened at a room temperature, and then the hardened gel ball is washed with water and then the washed gel ball is dried to obtain the sodium alginate-gelatin based biochar multivariate composite material. In an embodiment, a mass concentration of the $CaCl_2$ solution is in a range of 4.5 to 5.3%, specifically, 5%, a hardening time is in a range of 24-48 hours, specifically, 24 hours, a drying temperature is in a range of 45-55° C., specifically, 50° C., a drying time is in a range of 18-30 hours, and specifically 24 hours.

The sodium alginate and the gelatin are mixed together as a hydrogel polymer matrix, the biochar is wrapped in the hydrogel polymer matrix, and thereby produces the sodium alginate-gelatin based biochar multivariate composite materials (SA-GE@BC). On the one hand, the embedding of biochar improves the mechanical properties of the polymeric hydrogel polymer matrix, the support of biochar can enrich the pore structures of the polymeric hydrogel matrix, which is conducive to the diffusion of heavy metal ions to the adsorption site of the composite material for their removal. On the other hand, the hydrogel polymer matrix can provide a stable framework support for the biochar, so that the biochar will not be lost and is easy to be recovered. The abundant oxygen-containing functional groups on the surface of the hydrogel polymer matrix can exchange ions with cadmium divalent cation ($Cd^{2+}$), thus further strengthening the adsorption effect.

Specifically, a method for removing cadmium in water body is also provided and includes steps: a potential of hydrogen (pH) of the water body is adjusted, then the sodium alginate-gelatin based biochar multivariate composite material prepared by the preparation method is added into the water body and mixed evenly to remove the cadmium.

In an embodiment, the pH of the water body is in a range of 4-7, and a temperature of the water bodied is in a range of 293-313 Kelvins (K), specifically, 313 K, and a dosage of the sodium alginate-gelatin based biochar multivariate composite material is in a range of 0.5-3.0 grams per liter (g/L), specifically, 1 g/L.

In an embodiment, an effective pH range for the adsorption and removal of $Cd^{2+}$ by the composite material is in a range of 4-7, which is close to the pH value of the water body contaminated by the cadmium. Therefore, the adsorbent can be suitable for the treatment of an actual water body.

In order to better understand the disclosure, the content of the disclosure will be further elucidated in conjunction with embodiments, but the content of the disclosure is not limited to the following embodiments.

Embodiment 1

1. Preparation of the biochar (BC)

1.1 hulls of water chestnuts are washed with a distilled water and dried in an electric hot air drying oven at 60° ° C. until a constant weight, then the dried hulls of water chestnuts are cooled and put to a grinder to crush, followed by screening the crushed hulls of water chestnuts through a sieve with a mesh size of 50 mesh to obtain screened powder of the hulls of water chestnuts and the screened powder of the hulls of water chestnuts is transferred to a tube furnace to dry to obtain dried powder of the hulls of water chestnuts after being placed in a quartz boat. Then the dried powder of the hulls of water chestnuts is heated up to a temperature of 850° C. in an anaerobic environment of nitrogen atmosphere ($N_2$) at a rate of 10° C./min and kept the temperature for 1 hour to obtain heated powder of the hulls of water chestnuts, the heated powder of the hulls of water chestnuts is taken out and collected after cooling, and the heated powder of the hulls of water chestnuts is washed with the ultrapure water to neutral and the washed powder of the hulls of water chestnuts is dried at 105° C. for 12 hours to obtain the biochar, the biochar is placed in a desiccator for standby.

2. Preparation of the sodium alginate-gelatin based biochar multivariate composite material
   (1) the sodium alginate and the gelatin are added into 200 ml of the ultrapure water, and stirred at 45° C. for 4 hours to obtain a mixed solution I;
   (2) the biochar is added into the mixed solution I, and stirred at 45° C. for 2 hours to obtain a mixed solution II, and a mass ratio of the gelatin, the sodium alginate, and the biochar is 1:1:1;
   (3) the mixed solution II is dropped into a mass concentration is 5% of $CaCl_2$ solution to form a gel ball, the gel ball is further hardened at a room temperature for 24 hours, and then the hardened gel ball is washed with water and then the washed gel ball is dried at 50° C. for 24 hours to obtain the sodium alginate-gelatin based biochar multivariate composite material.

Embodiment 2

1. Preparation of the biochar is the same as embodiment 1

2. Preparation of the sodium alginate-gelatin based biochar multivariate composite material
   (1) the gelatin and the sodium alginate in a mass ratio of 4:1 are added into 200 mL of the ultrapure water, and stirred at 55° C. for 5 hours to obtain a mixed solution I;
   (2) according to the biochar and the sodium alginate in a mass ratio of 3:1, the biochar is added into the mixed solution I, and stirred at 45° C. for 2 hours to obtain a mixed solution II;
   (3) the mixed solution II is dropped into a mass concentration is 5.3% of $CaCl_2$ solution to form a gel ball, the gel ball is further hardened at a room temperature for 48 hours, and then the hardened gel ball is washed with water and then the washed gel ball is dried at 55° C. for 18 hours to obtain the sodium alginate-gelatin based biochar multivariate composite material.

Embodiment 3

1. Preparation of the biochar is the same as embodiment 1

2. Preparation of the sodium alginate-gelatin based biochar multivariate composite material
   (1) the gelatin and the sodium alginate in a mass ratio of 2:1 are added into 200 mL of the ultrapure water, and stirred at 50° C. for 3 hours to obtain a mixed solution I;
   (2) according to the biochar and the sodium alginate in a mass ratio of 2:1, the biochar is added into the mixed solution I, and stirred at 50° C. for 2 hours to obtain a mixed solution II;

(3) the mixed solution II is dropped into a mass concentration is 4.5% of $CaCl_2$ solution to form a gel ball, the gel ball is further hardened at a room temperature for 24 hours, and then the hardened gel ball is washed with water and then the washed gel ball is dried at 45° C. for 30 hours to obtain the sodium alginate-gelatin based biochar multivariate composite material.

Embodiment 4

Removal of Cadmium in the Water Body

Determination of cadmium ion standard curve: the cadmium ion concentration gradients are configured as 0.5 milligrams per liter (mg/L), 1 mg/L, 2 mg/L, 3 mg/L, 5 mg/L at a wavelength of 228.8 nm to determine the absorbances as 0.0619 (liter per mole per centimeter) $L \cdot mol^{-1} \cdot cm^{-1}$, 0.14401 $L \cdot mol^{-1} \cdot cm^{-1}$, 0.28081 $L \cdot mol^{-1} \cdot cm^{-1}$, 0.54241 $L \cdot mol^{-1} \cdot cm^{-1}$, 0.82901 $L \cdot mol^{-1} \cdot cm^{-1}$, respectively. The cadmium ion concentration is taken as an x-axis and the absorbance is taken as a y-axis to establish a standard curve according to the formulas as follows:

$$Y=0.27424x+0.00659, R^2=0.9997,$$

where Y represents the absorbance, and x represents the cadmium ion concentration.

A sodium nitrate ($NaNO_3$) solution of 0.01 mol/L is prepared as a background electrolyte to the experiment to maintain ion strength. The SA-GE@BC of 1.0 g/L prepared in embodiment 1 is taken to add into a 100 mL of conical flask, and then 50 mL of 20 mg/L $Cd^{2+}$ solution with a pH of 4 are add into the conical flask, and followed by fixing the conical flask in a constant temperature water shaking box for shaking adsorption for 24 hours (170 revolutions per minute abbreviated as r/min) at a water temperature of 298 K to obtain a mixed solution in the conical flask. After completing the adsorption, the conical flask is removed, the mixed solution in the conical flask passes through 0.45 μm of a filter membrane to obtain a filtered solution, followed by collecting the filtered solution, after diluting the filtered solution with a low concentration of nitric acid ($HNO_3$), the absorbance of the filtered solution is measured to be 0.3961 $L \cdot mol^{-1} \cdot cm^{-1}$. According to the cadmium ion standard curve measured earlier, the cadmium ion concentration is calculated to be 1.42 mg/L.

Embodiment 5

Removal of Cadmium in the Water Body

The removal is basically same as embodiment 4, with the difference that the pH of $Cd^{2+}$ solution is 5, the absorbance is measured to be 0.2405 $L \cdot mol^{-1} \cdot cm^{-1}$, and the cadmium ion concentration is calculated to be 0.853 mg/L.

Embodiment 6

Removal of Cadmium in the Water Body

The removal is basically same as embodiment 4, with the difference that the pH of $Cd^{2+}$ solution is 6, the absorbance is measured to be 0.2243 $L \cdot mol^{-1} \cdot cm^{-1}$, and the cadmium ion concentration is calculated to be 0.794 mg/L.

Embodiment 7

Removal of Cadmium in the Water Body

The removal is basically same as embodiment 4, with the difference that the pH of $Cd^{2+}$ solution is 7, the absorbance is measured to be 0.2136 $L \cdot mol^{-1} \cdot cm^{-1}$, and the cadmium ion concentration is calculated to be 0.755 mg/L.

Comparative Embodiment 1

Removal of Cadmium in the Water Body

The removal is basically same as embodiment 4, with the difference that the pH of $Cd^{2+}$ solution is 2, the absorbance is measured to be 0.5046 $L \cdot mol^{-1} \cdot cm^{-1}$, and the cadmium ion concentration is calculated to be 1.816 mg/L.

Comparative Embodiment 2

Removal of Cadmium in the Water Body

The removal is basically same as embodiment 4, with the difference that the pH of $Cd^{2+}$ solution is 3, the absorbance is measured to be 0.4906 $L \cdot mol^{-1} \cdot cm^{-1}$, and the cadmium ion concentration is calculated to be 1.765 mg/L.

Figure 4:
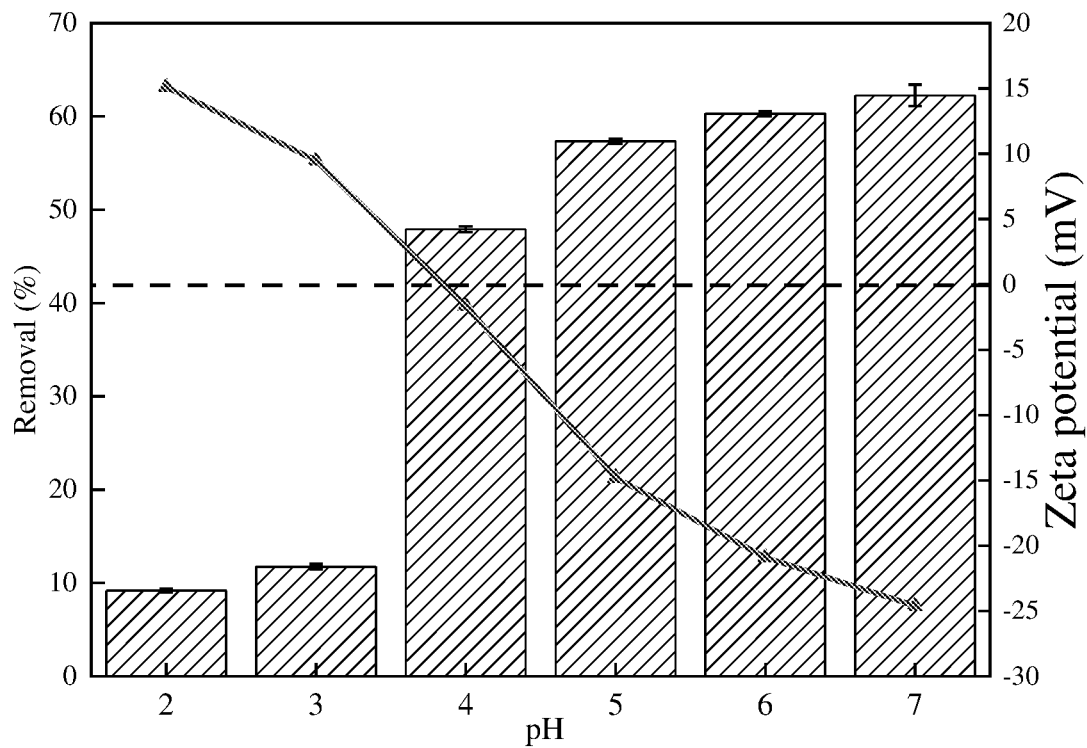
FIG. 4 illustrates an adsorption of cadmium divalent cation ($Cd^{2+}$) by the SA-GE@BC according to embodiments 4-7 and comparative embodiments 1-2 of the disclosure.

FIG. 4 illustrates an adsorption of $Cd^{2+}$ by the SA-GE@BC in embodiments 4-7 and comparative embodiments 1-2. As shown in FIG. 4, changes of pH in solution can affect precipitation and ion exchange reactions. At pH 2 and 3 of the solution, there is almost no adsorption of $Cd^{2+}$ by the SA-GE@BC. The adsorption of $Cd^{2+}$ by the adsorbent is gradually increasing with the increase of pH. At pH 4 of the solution, the adsorption capacity of the SA-GE@BC for $Cd^{2+}$ rapidly increases. As the pH continues to increase, the adsorption capacity of the SA-GE@BC for $Cd^{2+}$ gradually increases but the increase is not significant, and the maximum adsorption capacity is reached at pH=7. Within the range of pH measurement, the zeta potential value on the surface of the adsorbent is negatively correlated with the pH. A $pH_{PZC}$ value of the SA-GE@BC is 3.86. When the pH value of the solution is less than the $pH_{PZC}$ value of the SA-GE@BC, the charge distributed on the surface of the SA-GE@BC is positive, the adsorption of $Cd^{2+}$ by SA-GE@BC is affected by the presence of electrostatic repulsion, resulting in a situation where the adsorbent hardly adsorbs $Cd^{2+}$ at low pH. When the $pH_{PZC}$ value of the SA-GE@BC is less than the pH value of the solution, —OH and —COOH on the surface of the adsorbent undergo protonation, which causes the surface of the SA-GE@BC is negatively charged, and under the action of electrostatic attraction, the protonation promotes the adsorption of $Cd^{2+}$ by the adsorbent. As the pH value continues to increase, the competitive adsorption between $H^+$ and $Cd^{2+}$ weakens, indicating a significant increase in the adsorption capacity of the adsorbent for $Cd^{2+}$. In the disclosure, the effective pH range of the SA-GE@BC for adsorption and removal of $Cd^{2+}$ is 4-7, which is close to the pH value of water body contaminated by the cadmium. Therefore, the adsorbent can be suitable for the treatment of the actual water body.

Embodiment 8

A (sodium nitrate) $NaNO_3$ solution of 0.01 mol/L is prepared as a background electrolyte to the experiment to maintain ion strength. The SA-GE@BC of 0.5 g/L is taken to add into a 100 mL of conical flask, and then 50 mL of 20 mg/L $Cd^{2+}$ solution with a pH of 7 are add into the conical flask, and followed by fix the conical flask in a constant temperature water shaking box for shaking adsorption for 24 hours (170 r/min) at a water temperature of 298 K to obtain a mixed solution in the conical flask. After completing the adsorption, the conical flask is removed, the mixed solution in the conical flask passes through 0.45 μm of a filter membrane to obtain a filtered solution, followed by collecting the filtered solution, after diluting the filtered solution with a low concentration of (nitric acid) $HNO_3$, the absorbance of the filtered solution is measured to be 0.3425 L·mol$^{-1}$·cm$^{-1}$. According to the cadmium ion standard curve measured earlier, the cadmium ion concentration is calculated to be 1.225 mg/L.

Embodiment 9

Removal of Cadmium in the Water Body

The removal is basically same as embodiment 8, with the difference that the SA-GE@BC of 1.0 g/L is taken, the absorbance is measured to be 0.2054 L·mol$^{-1}$·cm$^{-1}$, and the cadmium ion concentration is calculated to be 0.725 mg/L.

Embodiment 10

Removal of Cadmium in the Water Body

The removal is basically same as embodiment 8, with the difference that the SA-GE@BC of 1.5 g/L is taken, the absorbance is measured to be 0.1322 L·mol$^{-1}$·cm$^{-1}$, and the cadmium ion concentration is calculated to be 0.458 mg/L.

Embodiment 11

Removal of Cadmium in the Water Body

The removal is basically same as embodiment 8, with the difference that the SA-GE@BC of 2.0 g/L is taken, the absorbance is measured to be 0.0804 L·mol$^{-1}$·cm$^{-1}$, and the cadmium ion concentration is calculated to be 0.269 mg/L.

Embodiment 12

Removal of Cadmium in the Water Body

The removal is basically same as embodiment 8, with the difference that the SA-GE@BC of 2.5 g/L is taken, the absorbance is measured to be 0.0272 L·mol$^{-1}$·cm$^{-1}$, and the cadmium ion concentration is calculated to be 0.0753 mg/L.

Embodiment 13

Removal of Cadmium in the Water Body

The removal is basically same as embodiment 8, with the difference that the SA-GE@BC of 3.0 g/L is taken, the absorbance is measured to be 0.0151 L·mol$^{-1}$·cm$^{-1}$, and the cadmium ion concentration is calculated to be 0.0312 mg/L.

Figure 5:
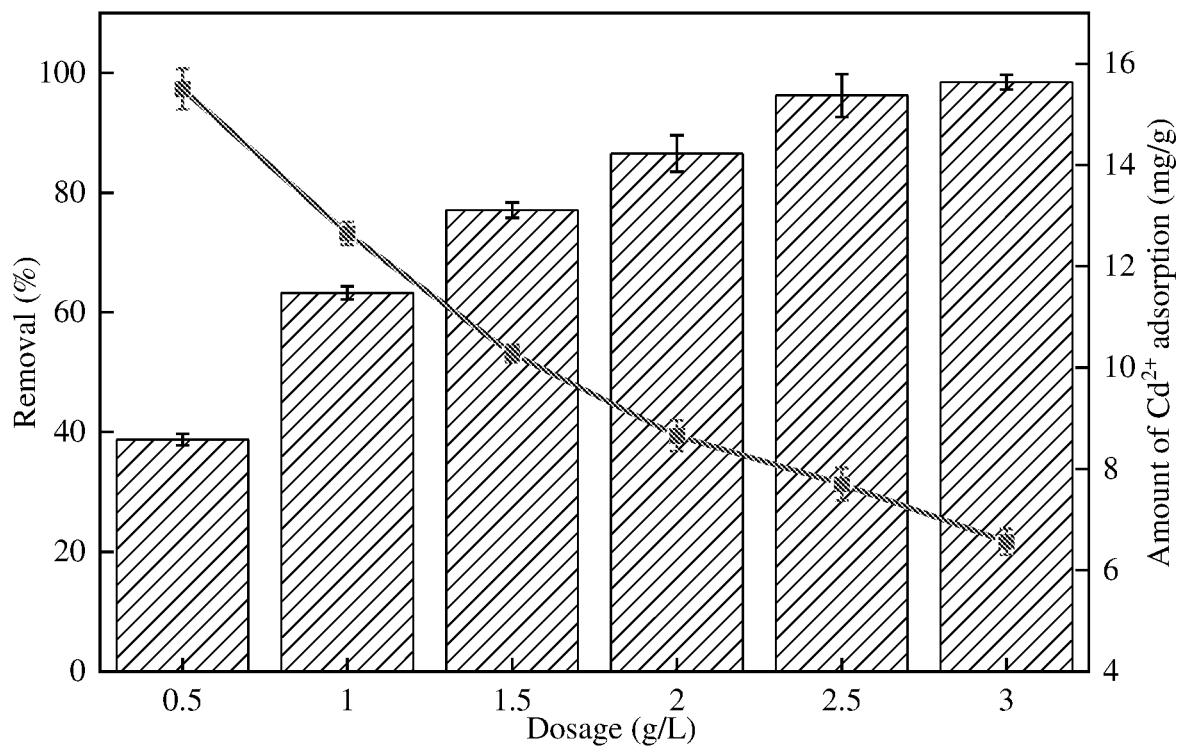
FIG. 5 illustrates an adsorption effect of different amounts of the added SA-GE@BC on $Cd^{2+}$ according to embodiments 8-13 of the disclosure.

FIG. 5 illustrates an adsorption effect of different amounts of the added SA-GE@BC on $Cd^{2+}$ in embodiments 8-13. As shown in FIG. 5, the removal efficiency of $Cd^{2+}$ is positively correlated with the amount of adsorbent added, as an increase in dosage brings more active adsorption sites and increases the probability of contact between $Cd^{2+}$ and active sites. At higher adsorbent dosages, the decrease in adsorption capacity is due to the overlap of active sites, which reduces the effective contact surface and increases the length of the $Cd^{2+}$ diffusion pathway. When the dosage of the SA-GE@BC is 1 g/L, the removal rate of $Cd^{2+}$ reaches over 60%, and also ensures a high adsorption capacity.

Embodiment 14

Figure 6:
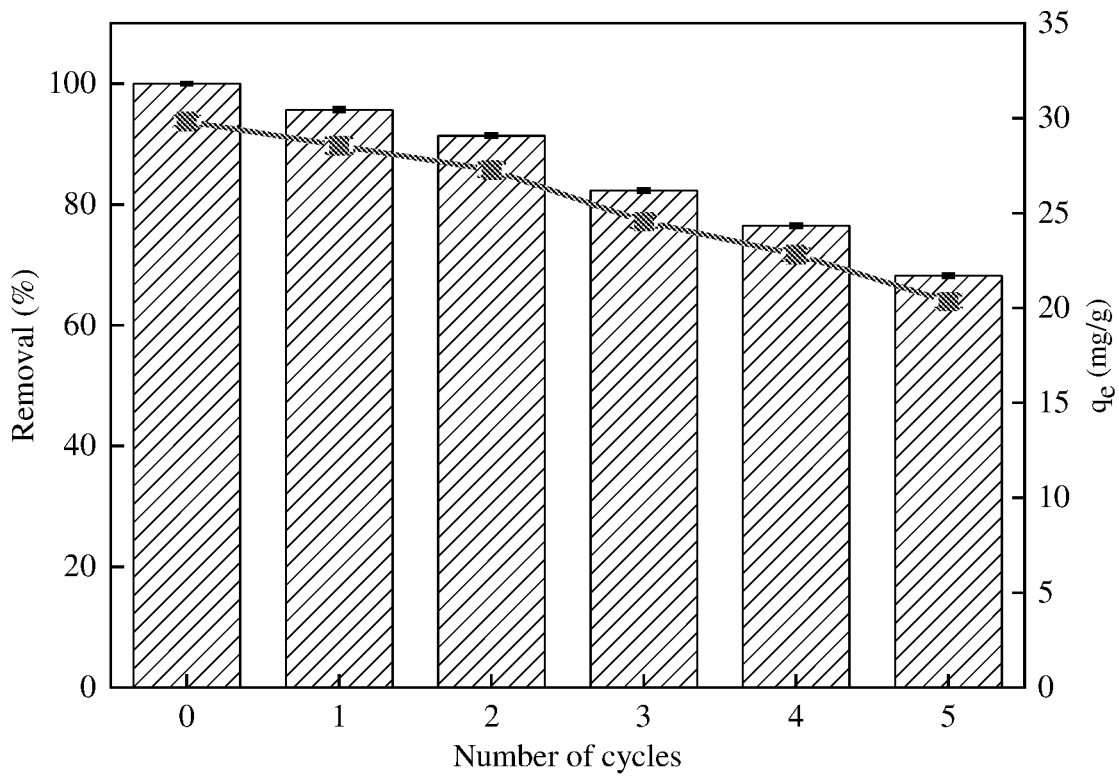
FIG. 6 illustrates a regeneration experimental data of saturated SA-GE@BC.

Cyclic Regeneration Performance of SA-GE@BC 0.05 g of the SA-GE@BC is added to 50 mL of 50 mg/L $Cd^{2+}$ solution for shaking adsorption for 24 hours. The pH of the $Cd^{2+}$ solution is 7 and the temperature is 298 K. After completing the shaking adsorption, the absorbance is measured, and the saturated SA-GE@BC is added to 100 mL of 0.1 mol/L $HNO_3$ solution for regeneration for 24 hours. After washing with the ultrapure water, put it into the next adsorption cycle and repeat this process five times. The results of five regeneration experiments are shown in FIG. 6.

The cyclic regeneration performance of adsorbents is one of the standards for measuring whether they are high-performance and high-quality materials, which directly determines the production cost and potential for large-scale application of adsorbents. It can be seen that the adsorption capacity of the SA-GE@BC has decreased after each regeneration experiment, and after five cycles, the final adsorption capacity is 20.35 milligrams per gram (mg/g). After five cycles, the adsorption rates decreased by 4.32%, 8.61%, 17.69%, 23.49%, and 31.80%, respectively. This result demonstrates that SA-GE@BC have a good regeneration and a good reusability.

Embodiment 15

Compared with Similar Adsorbents

TABLE 1 shows comparison parameters of similar adsorbents

| Composition of composite material | Maximum adsorption capacity (mg/g) | Temperature (T) | Reference document |
|---|---|---|---|
| sodium alginate-biochar of water hyacinth (also referred to as *Pontederia crassipes*) | 36.5 | 310 | [1] |
| sodium alginate-biochar of peanut shell-ferric oxide | 41.3 | 298 | [2] |
| commercial activated carbon-chitosan | 53.63 | 298 | [3] |
| sodium alginate-calcium carbonate | 10.2 | 318 | [4] |
| titanium dioxide-sodium alginate | 18.85 | 303 | [5] |
| ferric oxide fine powder-sodium alginate | 102.2 | 318 | [6] |
| buffalo weed (also referred to as *Buchloe dactyloides* (Nutt.) Engelm.) biochar-sodium alginate | 9.73 | 298 | [7] |
| powdered activated carbon-sodium alginate | 89.6 | 298 | [8] |
| polypropylene alcohol-sodium alginate-nano-magnetic iron | 610.67 | 333 | [9] |
| sodium alginate-gelatin-hulls of water chestnuts | 86.25 | 313 | the disclosure |

[1] Cenwei Liu et al, Removal of Cadmium (II) using water hyacinth (*Eichhornia crassipes*) biochar alginate beads in aqueous solutions, Environmental Pollution, September, 2020, pages 1-9.

[2] Radheshyam R. Pawar et al, Efficient removal of hazardous lead, cadmium, and arsenic from aqueous environment by iron oxide modified clay-activated carbon composite beads, Applied Clay Science, 2018, pages 339-350.

[3] Shahin Hydari et al, a comparative investigation on removal performances of commercial activated carbon, chitosan biosorbent and chitosan/activated carbon composite for cadmium, Chemical Engineering Journal, 2012, pages 276-282.

[4] Zahid Mahmood et al, Adsorption studies of cadmium ions on alginate-calcium carbonate composite beads, Applied Water Science, 2015, pages 915-921.

[5] D. Kołodyńska et al, Titania-Coated Silica Alone and Modified by Sodium Alginate as Sorbents for Heavy Metal Ions, Nanoscale Research Letters, 2018, pages 1-12.

[6] Mahmoud M E et al, A sustainable nanocomposite for removal of heavy metals from water based on crosslinked sodium alginate with iron oxide waste material from steel industry, Journal of Environmental Chemical Engineering, 2020, pages 1-40.
[7] Hoon Roh et al, Removal studies of Cd(II) and explosive compounds using buffalo weed biochar-alginate beads, Journal of Industrial and Engineering Chemistry, 2015, pages 226-233.
[8] Abinashi Sigdel et al, Concurrent removal of cadmium and benzene from aqueous solution by powdered activated carbon impregnated alginate beads, Catena, 2016, pages 101-107.
[9] Imran Ali et al, Encapsulated green magnetic nanoparticles for the removal of toxic Pb2+ and Cd2+ from water: Development, characterization and application, Journal of Environmental Management, 2019, pages 273-289.

From the Table 1, it can be seen that the SA-GE@BC prepared in the disclosure has strong adsorption performance. Compared with bison buffalo weed biochar-sodium alginate composite material (9.73 mg/g), sodium alginate-calcium carbonate composite material (10.2 mg/g), and titanium dioxide-sodium alginate composite material (18.85 mg/g), the adsorption capacity of the SA-GE@BC for $Cd^{2+}$ is several times higher than the bison buffalo weed biochar-sodium alginate composite material, the sodium alginate-calcium carbonate composite material, and the titanium dioxide-sodium alginate composite material, simultaneously, the adsorption capacity of the SA-GE@BC for $Cd^{2+}$ is also much higher than sodium alginate-biochar of water hyacinth composite material (36.5 mg/g) and commercial activated carbon-chitosan composite material (52.63 mg/g). Overall, compared with similar adsorbents, the adsorption capacity of ternary composite materials is superior to that of binary composite materials. Compared to the astonishing adsorption capacity of polypropylene alcohol-sodium alginate-nano-magnetic iron composite material (610.67 mg/g), the multivariate composite gel of the SA-GE@BC prepared in the disclosure does not need so complicated steps, the source of raw materials is also very wide, the preparation cost is also low, and the reaction temperature during adsorption is not so high.

The above embodiments only express several embodiments of the disclosure, and their description is more specific and detailed. However, it cannot be understood as a limitation on the scope of the disclosure. It should be pointed out that for those skilled in the art, several modifications and improvements can be made without departing from the concept of the disclosure, all of which fall within the scope of protection of the disclosure. Therefore, the scope of protection of the disclosure should be based on the attached claims.

What is claimed is:

1. A preparation method for a sodium alginate-gelatin based biochar multivariate composite material, comprising:

step (1), adding sodium alginate and gelatin into first ultrapure water, and stirring to obtain a mixed solution I;

step (2), adding biochar into the mixed solution I, and stirring to obtain a mixed solution II; and step (3), dropping the mixed solution II into a calcium chloride ($CaCl_2$) solution to form a gel ball, further hardening the gel ball at a room temperature, and then washing the hardened gel ball with water and then drying the washed gel ball to obtain the sodium alginate-gelatin based biochar multivariate composite material;

wherein a volume of the first ultrapure water is in a range of 180-250 milliliters (mL), a mass ratio of the gelatin to the sodium alginate is (1-4):1, and a mass ratio of the biochar to the sodium alginate is (1-3):1;

wherein the biochar is prepared by:

washing hulls of water chestnuts and drying the washed hulls of water chestnuts at 50-60° C. until a constant weight is obtained, then cooling and crushing the dried hulls of water chestnuts, screening the crushed hulls of water chestnuts through a sieve with a mesh size in a range of 40-80 mesh to obtain screened powder of the hulls of water chestnuts and drying the screened powder of the hulls of water chestnuts to obtain dried powder of the hulls of water chestnuts; then heating the dried powder of the hulls of water chestnuts up to a temperature of 850° C. in an anaerobic environment at a rate of 10 degree Celsius per minute (° C./min) and keeping the temperature for 1 hour to obtain heated powder of the hulls of water chestnuts, taking out and collecting the heated powder of the hulls of water chestnuts after cooling, and washing the heated powder of the hulls of water chestnuts with second ultrapure water to make pH to be 7 and drying the washed powder of the hulls of water chestnuts at 105° C. for 12 hours to obtain the biochar, placing the biochar in a desiccator for standby.

2. The preparation method as claimed in claim 1, wherein the stirring of the step (1) comprises: stirring for 3-5 hours at a stirring temperature in a range of 45-55° C.

3. The preparation method as claimed in claim 1, wherein the stirring of the step (2) comprises: stirring for 2-4 hours at a stirring temperature in a range of 45-55° C.

4. The preparation method as claimed in claim 1, wherein a mass concentration of the $CaCl_2$ solution in the step (3) is in a range of 4.5-5.3%, a drying temperature in the step (3) is in a range of 45-55° C., a drying time in the step (3) is in a range of 18-30 hours, and a hardening time is in a range of 24-48 hours.

* * * * *